US012768522B2

(12) United States Patent
Zhou et al.

(10) Patent No.: US 12,768,522 B2
(45) Date of Patent: Oct. 20, 2026

(54) LIGHTING APPARATUS

(71) Applicant: LEEDARSON LIGHTING CO., LTD., Zhangzhou (CN)

(72) Inventors: Yuanlin Zhou, Zhangzhou (CN); Lei Zhang, Zhangzhou (CN); Siliang Wu, Zhangzhou (CN); Zhirong Xie, Zhangzhou (CN)

(73) Assignee: LEEDARSON LIGHTING CO., LTD., Zhangzhou (CN)

( * ) Notice: Subject to any disclaimer, the term of this patent is extended or adjusted under 35 U.S.C. 154(b) by 0 days.

(21) Appl. No.: 19/025,113

(22) Filed: Jan. 16, 2025

(65) Prior Publication Data

US 2025/0230921 A1 Jul. 17, 2025

(30) Foreign Application Priority Data

Jan. 16, 2024 (CN) ......................... 202420104850.5

(51) Int. Cl.

| | |
|---|---|
| ***F21V 21/005*** | (2006.01) |
| ***F21V 15/015*** | (2006.01) |
| ***F21V 23/00*** | (2015.01) |
| ***F21V 23/06*** | (2006.01) |
| ***H05B 47/155*** | (2020.01) |
| *F21Y 115/10* | (2016.01) |

(52) U.S. Cl.

CPC .......... *F21V 21/005* (2013.01); *F21V 15/015* (2013.01); *F21V 23/001* (2013.01); *F21V 23/06* (2013.01); *H05B 47/155* (2020.01); *F21V 2200/20* (2015.01); *F21Y 2115/10* (2016.08)

(58) Field of Classification Search

CPC .. F21V 23/0435; F21V 23/005; F21V 23/003; F21V 23/004; F21V 23/06; F21V 23/001; F21V 15/01; F21V 21/005; F21V 2200/20; F21Y 2115/10; H05B 47/155

See application file for complete search history.

(56) References Cited

U.S. PATENT DOCUMENTS 7,889,286 B2 * 2/2011 Yoo .................. G02F 1/133608 349/56

8,085,364 B2 * 12/2011 Travis .................. G02B 6/0068 349/95

(Continued)

FOREIGN PATENT DOCUMENTS

| | | | | |
|---|---|---|---|---|
| CN | 110100502 B | * | 5/2022 | ........... H05B 47/115 |
| CN | 117432982 A | * | 1/2024 | ............ F21V 21/005 |

(Continued)

OTHER PUBLICATIONS

Innovation Q+NPL Search (Year: 2025).*

*Primary Examiner* — Anabel Ton

(74) *Attorney, Agent, or Firm* — LANWAY IPR SERVICES; Chun-Ming Shih

(57) ABSTRACT

A lighting apparatus includes multiple light units, a first bar cover, a second bar cover and multiple connectors. Each light unit includes a bar housing, a light source and a light cover. The first bar cover is allocated for each light unit. The second bar cover is allocated for each light unit. The first bar cover and the second bar cover are attached on two ends of the corresponding light unit to conceal the light source in the bar housing. The multiple light units are joint by the connectors to form a frame light structure.

19 Claims, 6 Drawing Sheets

(56) References Cited

U.S. PATENT DOCUMENTS

| | | | | |
|---|---|---|---|---|
| 8,998,476 | B2 * | 4/2015 | Hosoki | G02B 6/0068 362/97.3 |
| 11,821,594 | B2 * | 11/2023 | Cai | F21S 4/28 |
| 2013/0258702 | A1 * | 10/2013 | Kim | G02B 6/0091 362/602 |
| 2014/0160754 | A1 * | 6/2014 | Lee | H05B 47/1985 362/249.02 |
| 2015/0241730 | A1 * | 8/2015 | Kondoh | H04N 5/655 348/794 |
| 2017/0292683 | A1 * | 10/2017 | Kim | F21S 4/28 |
| 2019/0025651 | A1 * | 1/2019 | Sugiyama | G02F 1/133605 |
| 2020/0400297 | A1 * | 12/2020 | Hou | F21K 9/61 |
| 2025/0084985 | A1 * | 3/2025 | Liu | F21V 17/16 |

FOREIGN PATENT DOCUMENTS

| | | | | |
|---|---|---|---|---|
| JP | 2020202364 | A * | 12/2020 | H10H 20/855 |
| WO | WO-2012158908 | A2 * | 11/2012 | H05B 45/20 |

* cited by examiner

LIGHTING APPARATUS

FIELD

The present invention is related to a lighting apparatus, and more particularly related to a lighting apparatus with an assembly structure.

BACKGROUND

LED technology has revolutionized light device design, becoming the standard for modern illumination due to its unparalleled efficiency and versatility. Unlike traditional light sources such as incandescent or fluorescent bulbs, LEDs (light-emitting diodes) are highly energy-efficient, converting a significant portion of electrical energy into visible light with minimal heat loss. This efficiency not only reduces energy consumption but also translates into lower electricity bills and a smaller environmental footprint, making LEDs an eco-friendly choice for both residential and commercial lighting.

Another advantage of LED technology is its remarkable durability and longevity. LEDs can operate for tens of thousands of hours, far outlasting traditional light bulbs. This extended lifespan reduces the frequency of replacements, which is particularly valuable in hard-to-reach installations or applications requiring constant, reliable lighting. Additionally, the robust construction of LEDs, often encapsulated in solid-state materials, makes them resistant to shock, vibrations, and extreme temperatures, enhancing their reliability in diverse environments.

LEDs also offer unparalleled design flexibility, enabling the creation of innovative lighting devices tailored to specific needs. Their small size and directional light output make them suitable for compact, intricate designs, such as decorative fixtures or task lighting. Furthermore, advancements in LED technology allow for precise control over color, brightness, and beam angle, which designers can leverage to create dynamic lighting effects or meet stringent performance criteria. This versatility is why LEDs are commonly used in applications ranging from architectural lighting to automotive headlights and beyond.

A significant benefit of LEDs is their compatibility with smart lighting systems, which are increasingly in demand for home automation and energy management. LEDs can be seamlessly integrated with dimmers, sensors, and controllers, offering users the ability to adjust brightness, color temperature, or even light patterns through mobile apps or voice commands. This integration not only enhances convenience but also provides data-driven insights into energy usage, allowing for further optimization of lighting systems to save costs and reduce waste.

The environmental benefits of LED technology extend beyond energy efficiency. LEDs are free from toxic elements like mercury, commonly found in fluorescent lights, making them safer for disposal and recycling. Additionally, their lower energy requirements reduce the strain on power grids and decrease greenhouse gas emissions associated with electricity production. As governments and industries worldwide adopt stricter sustainability goals, the widespread implementation of LED lighting plays a crucial role in achieving these targets while maintaining high-quality illumination.

Maintaining compatibility with traditional dimmer designs while incorporating the new technology of LEDs is critical for ensuring a seamless transition to modern lighting systems. Traditional dimmers, commonly found in homes and commercial spaces, were originally designed for incandescent bulbs and operate by cutting the AC waveform to adjust brightness. LED technology, with its distinct electrical properties, often requires specialized circuits or drivers to work with these dimmers effectively. By designing LED lighting systems that remain compatible with existing dimmers, manufacturers can simplify the adoption process for consumers, eliminating the need for costly rewiring or replacement of dimmer infrastructure.

This compatibility is particularly beneficial for retaining the user-friendly features and familiar interfaces of traditional dimmers. Many consumers and professionals rely on the tactile control and simplicity of existing dimmer switches, which are widely installed and understood. By ensuring that LED systems integrate seamlessly with these dimmers, manufacturers can offer a consistent user experience while delivering the energy efficiency, longevity, and advanced features of LED technology. Compatibility also opens up opportunities for mixed-use environments where both traditional and LED lighting may coexist, providing flexibility in upgrading lighting systems incrementally rather than requiring an all-at-once overhaul.

Beyond practicality, fostering compatibility with traditional dimmers paves the way for inventive solutions that bridge old and new technologies. Developing advanced LED controllers that can interpret and respond to the signals from legacy dimmers introduces novel methods of enhancing performance and user satisfaction. For instance, such innovations could include adaptive drivers that dynamically optimize brightness and color consistency in response to dimmer settings or hybrid systems that transition effortlessly between traditional dimmer control and smart lighting functionality. These advancements not only make LED systems more versatile but also ensure that new technology respects and builds upon existing infrastructure, accelerating adoption while opening the door to groundbreaking inventions.

Lighting devices are ubiquitous in modern life, fulfilling essential roles in homes, workplaces, public spaces, and transportation systems. From compact flashlights to intricate chandelier systems, their diversity reflects the wide range of applications and consumer preferences. Each type is tailored for specific needs, such as high-intensity floodlights for outdoor use or ambient LEDs for indoor decor. The demand for these devices is robust, driven by their necessity in creating functional and aesthetic environments. However, this variety poses challenges for manufacturers, retailers, and logistics providers in managing inventory efficiently.

One of the significant challenges in stocking lighting devices is the unpredictability of consumer demand. While certain products, like standard bulbs, may sell consistently, niche items such as specialty lighting for art displays or seasonal decorative lights have more fluctuating demand. This unpredictability complicates forecasting, leading to either overstocking or shortages. Retailers must strike a delicate balance to avoid tying up capital in unsold inventory while ensuring that popular products remain available. As a result, inventory management becomes a critical factor in the lighting industry.

Given the high costs associated with maintaining a large inventory of diverse lighting products, there is a growing emphasis on minimizing stock volume. Retailers and manufacturers are exploring innovative ways to streamline their offerings without compromising consumer satisfaction. Compact, modular lighting solutions that can be expanded or customized during use are gaining traction. These designs reduce storage space requirements while offering flexibility for consumers, making them an appealing choice for both buyers and sellers.

Furthermore, the development of collapsible or multi-functional lighting devices aligns with broader sustainability goals. By reducing the size of products during transport and storage, companies can lower their carbon footprint and logistics costs. For example, foldable LED panels and stackable fixtures are becoming popular options for their practicality and efficiency. These products cater to consumers' need for adaptable solutions while addressing the industry's logistical challenges, demonstrating the potential for innovation to drive both profitability and environmental responsibility.

In conclusion, while the variety of lighting devices reflects the diverse needs of consumers, it also presents significant inventory management challenges. The unpredictability of demand and the costs of stocking a wide range of products make it essential for manufacturers and retailers to seek innovative solutions. Minimizing the size of products at the point of sale and designing them to expand during use is a promising strategy that balances efficiency, flexibility, and consumer satisfaction. By embracing such approaches, the industry can navigate the complexities of demand while staying competitive in an ever-evolving market.

SUMMARY

In some embodiments, a lighting apparatus includes multiple light units, a first bar cover, a second bar cover and multiple connectors.

Each light unit includes a bar housing, a light source and a light cover.

The first bar cover is allocated for each light unit.

The second bar cover is allocated for each light unit.

The first bar cover and the second bar cover are attached on two ends of the corresponding light unit to conceal the light source in the bar housing.

The multiple light units are joint by the connectors to form a frame light structure.

In some embodiments, each light unit has a conductive electrode for all the light units are electrically connected to an external wire to receive an external power.

In some embodiments, a frame layer is disposed being surrounded by the frame light structure.

In some embodiments, the frame layer is a light guide plate.

In some embodiments, a lateral side of the light guide plate faces to the light source of the light unit to receive an input light.

The input light escapes from the light guide plate from a front surface of the light guide plate.

In some embodiments, the light cover of the light unit has a lens for condensing the input light emitting to the light guide plate.

In some embodiments, the frame layer is a reflective layer.

In some embodiments, the frame layer is foldable.

In some embodiments, the connector has a rotation structure for rotating a light output direction of the light source.

In some embodiments, the connector has an electrical connector module for routing electricity among the light units.

In some embodiments, a control module is disposed on the connector for providing a control signal to the light source.

In some embodiments, each light unit has a controller for controlling a parameter of the light source separately.

In some embodiments, the controllers of the multiple light units communicate with each other to synchronize in a predetermined pattern.

In some embodiments, one controller of one light unit receives an external command and transmits the external command to the other controllers of other light units.

In some embodiments, the frame light structure is a rectangular shape.

In some embodiments, more than one light units are selectively disposed to the same edge of the rectangular shape.

In some embodiments, the light unit is coupled to the connector with a magnetic unit.

In some embodiments, the light unit has multiple segments and there are joint between two adjacent segments.

In some embodiments, the multiple segments are foldable.

In some embodiments, the light cover is detachable for a user to replace the light source.

DETAILED DESCRIPTION

Figure 1:
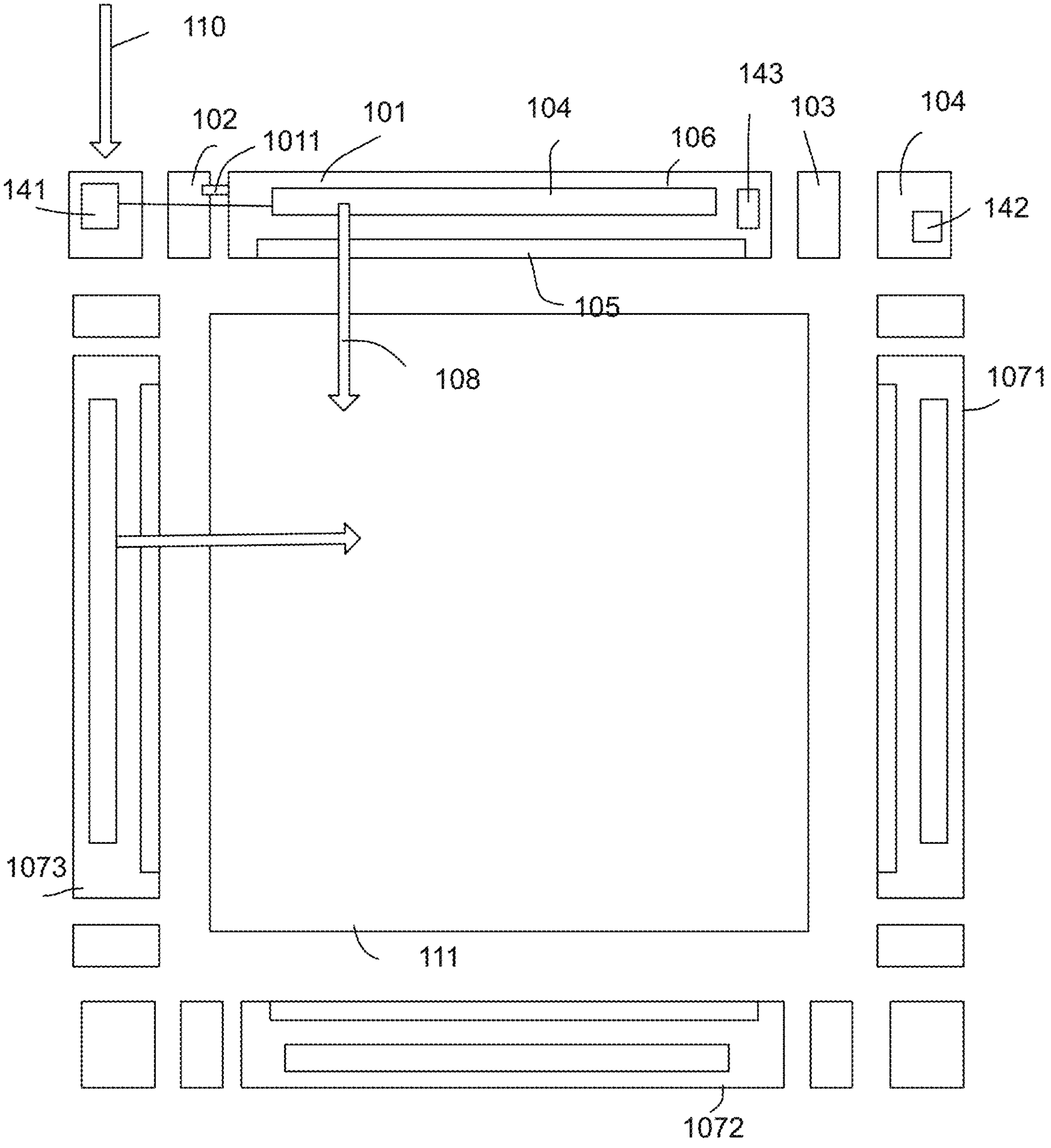
FIG. 1 illustrates a lighting apparatus embodiment.

FIG. 1 is an exploded view of a lighting apparatus embodiment.

In FIG. 1, a lighting apparatus includes multiple light units 101, 1071, 1072, 1073, a first bar cover 102, a second bar cover 103 and multiple connectors 104.

Each light unit 101 includes a bar housing 106, a light source 104 and a light cover 105.

The first bar cover 102 is allocated for each light unit 101.

The second bar cover 103 is allocated for each light unit 101.

The first bar cover 102 and the second bar cover 103 are attached on two ends of the corresponding light unit 101 to conceal the light source 104 in the bar housing 106.

The multiple light units 101, 1071, 1072, 1073 are joint by the connectors 104 to form a frame light structure.

FIG. 1 shows an example of such frame light structure, which is a rectangular shape.

In some embodiments, each light unit has a conductive electrode 1011 for all the light units are electrically connected to an external wire 110 to receive an external power.

In some embodiments, a frame layer 111 is disposed being surrounded by the frame light structure.

In some embodiments, the frame layer 111 is a light guide plate.

Figure 2:
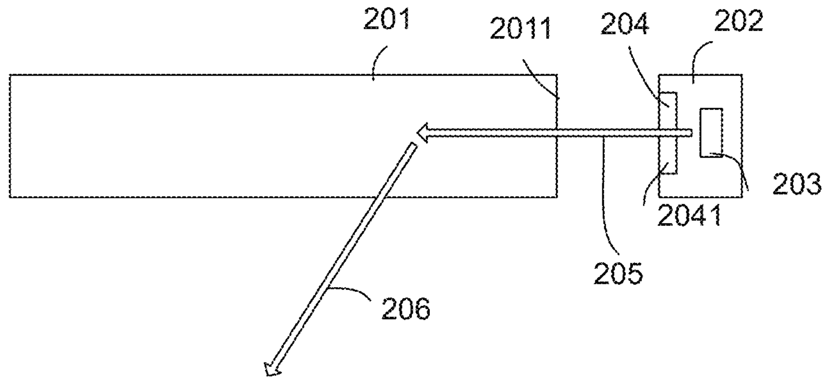
FIG. 2 shows a light guide plate example.

In FIG. 2, a lateral side 2011 of the light guide plate 201 faces to the light source 203 of the light unit 102 to receive an input light 205 through the light cover 204.

The input light escapes from the light guide plate from a front surface of the light guide plate.

In some embodiments, the light cover of the light unit has a lens 2041 for condensing the input light 205 emitting to the light guide plate 201.

In some embodiments, the frame layer is a reflective layer, e.g. a reflective sheet.

In some embodiments, the frame layer is foldable. This can further reduce the storage size during stocking or shipping.

In some embodiments, the connector has a rotation structure for rotating a light output direction of the light source.

Figure 3:
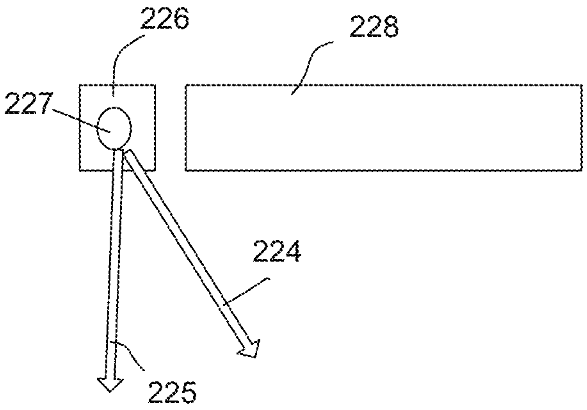
FIG. 3 shows an example that the light unit may be rotated to change its light output direction.

FIG. 3 shows such an example, a light unit 226 that is arranged in perpendicular to the light unit 228. The light unit 226 is rotatable with respect to the rotation structure 227, like a pivot, to change its light output direction from direction 225 to direction 224.

In FIG. 1, the connector has an electrical connector module 141 for routing electricity among the light units.

In some embodiments, a control module 142 is disposed on the connector for providing a control signal to the light source.

In some embodiments, each light unit has a controller 143 for controlling a parameter of the light source 104 separately.

In some embodiments, the controllers of the multiple light units communicate with each other to synchronize in a predetermined pattern.

In some embodiments, one controller of one light unit receives an external command and transmits the external command to the other controllers of other light units.

In some embodiments, the frame light structure is a rectangular shape.

In some embodiments, more than one light units are selectively disposed to the same edge of the rectangular shape.

Figure 4:
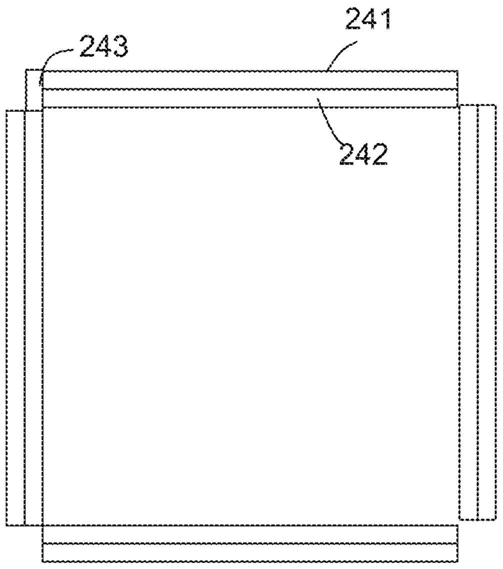
FIG. 4 shows a variation that the light units may be coupled as a module when required.

FIG. 4 shows such an example, for one edge of the rectangular frame, there are two light units 241, 242 connected together to provide double light intensity.

In some embodiments, the light unit is coupled to the connector with a magnetic unit 243.

Figure 5:
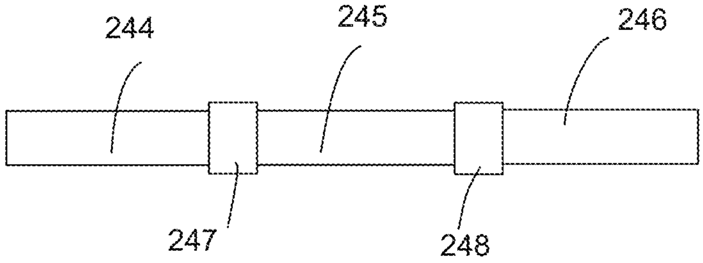
FIG. 5 shows a light units with multiple foldable segments.

In FIG. 5, the light unit has multiple segments 244, 245, 246 and there are joint 247, 248 between two adjacent segments.

In some embodiments, the multiple segments are foldable.

In some embodiments, the light cover is detachable for a user to replace the light source.

The lighting apparatus described offers versatile configurations for various applications, making it suitable for both functional and aesthetic uses. For instance, in a modern home setting, the apparatus can be arranged in a rectangular frame above a dining table to provide consistent illumination. The connectors enable easy assembly and disassembly, allowing homeowners to adjust the size or shape of the frame light structure based on the room's layout or purpose.

In a retail environment, the lighting apparatus could be installed with a reflective frame layer to enhance product displays. By positioning the light source to direct light onto reflective surfaces, the apparatus can amplify brightness while reducing energy consumption. The foldable nature of the reflective frame layer further allows shop owners to adjust the lighting angle to emphasize specific product zones, such as seasonal promotions or premium items.

In another scenario, the light units can include light guide plates that direct light uniformly across a surface. This is particularly beneficial for office spaces where consistent, glare-free illumination is crucial for employee productivity. The light guide plates ensure that light is evenly distributed without harsh shadows, creating a comfortable working environment. Additionally, the lens-integrated light covers enhance the efficiency of the light source by concentrating light input into the guide plates.

For environments requiring dynamic lighting, such as event venues or art galleries, the rotation-capable connectors provide flexibility in directing light. This enables the lighting apparatus to adapt to different settings, whether highlighting artwork on a wall or creating specific ambiance zones for an event. The electrical connectors within the apparatus also streamline the setup process, reducing the need for multiple external wiring connections.

The integration of controllers within each light unit further extends the versatility of the lighting apparatus. Users can adjust individual light units to achieve specific brightness levels, colors, or patterns. For example, in a theater, the lighting apparatus can create synchronized patterns that match the mood of a performance, enhancing the audience's experience. The communication between controllers allows seamless coordination, ensuring the lighting behaves as a cohesive system.

In smart home systems, the apparatus can respond to external commands through a central control module. This feature is ideal for integrating with voice assistants or smartphone apps, allowing users to schedule lighting changes or activate specific presets. For example, a user might set the apparatus to dim in the evening to create a relaxing atmosphere or brighten in the morning to simulate daylight.

The modular design of the light units, which includes detachable light covers, offers practical benefits for maintenance and customization. Users can easily replace faulty light sources or switch to different types of light covers, such as frosted or clear lenses, depending on their preference. This flexibility makes the apparatus a long-term investment for both residential and commercial users.

The magnetic coupling mechanism in the connectors simplifies the installation process, enabling quick and secure attachment of light units to the frame. This feature is particularly useful in settings where the lighting configuration may need frequent adjustments, such as trade shows or pop-up stores. The magnetic connectors also enhance the system's safety by reducing the risk of loose connections.

In outdoor settings, the foldable segments of the light units can adapt to uneven surfaces, such as the walls of a gazebo or pergola. The foldable design allows the apparatus to conform to various angles while maintaining a seamless appearance. Additionally, the weather-resistant materials used in the light units ensure durability and reliable performance under different weather conditions.

Finally, the rectangular frame design can accommodate multiple light units on the same edge, providing concentrated lighting in specific areas. This feature is ideal for creating task lighting over kitchen counters or workbenches. By adjusting the number and placement of light units, users can achieve precise illumination tailored to their needs, enhancing both functionality and efficiency.

Figure 6:
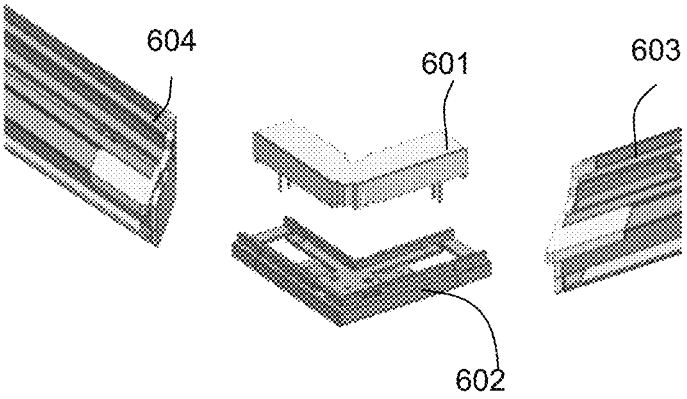
FIG. 6 shows another embodiment for a connector connecting two light units.

FIG. 6 shows another embodiment. In FIG. 6, the connector 602 is integrated with an electrical connector 601 that provides electrical connection among multiple light units 603, 604.

The lighting apparatus is particularly suited for creative applications in architectural and interior design. For instance, in modern office buildings with open ceilings, the apparatus can be used to create geometric light installations. By combining multiple rectangular frame structures in varying sizes, designers can craft visually striking patterns that double as functional lighting, adding a contemporary touch to the space.

In residential settings, the lighting apparatus can be integrated into living room decor, forming illuminated wall art. With its customizable frame light structure and foldable segments, it can adapt to different wall shapes and sizes. Homeowners can choose reflective layers or light guide plates to create dynamic lighting effects, such as soft ambient lighting for relaxation or focused illumination for reading nooks.

For industrial or workshop applications, the apparatus provides robust and flexible lighting solutions. The modular design allows users to connect light units to cover large areas efficiently, while the rotation-capable connectors ensure precise lighting direction. For example, in an assembly line, the apparatus can provide targeted lighting to enhance visibility in critical work areas, improving accuracy and safety.

The apparatus also excels in creating immersive experiences for entertainment venues. In gaming or esports arenas, the synchronized controllers of the light units can produce dynamic lighting effects that react to in-game events. For example, the frame lights could flash or change colors based on gameplay, enhancing the excitement for both players and spectators.

Retail stores can leverage the apparatus to highlight products with style and precision. The detachable light covers allow for easy customization of light diffusion and color temperature, ensuring that merchandise looks its best under optimal lighting conditions. This adaptability is especially beneficial for high-end boutiques, where lighting plays a crucial role in creating a premium shopping experience.

The apparatus also supports outdoor applications, such as lighting for patios or garden pathways. Its foldable and weather-resistant design makes it ideal for creating flexible and durable outdoor lighting solutions. For example, it can be used to frame walkways with soft, even illumination, enhancing both safety and aesthetics.

In educational environments, such as classrooms or lecture halls, the lighting apparatus can provide adaptive lighting to support different activities. Teachers can use the control module to adjust brightness levels or switch to warmer light tones for calming environments during reading sessions. The even distribution of light ensures that students in all parts of the room have adequate visibility.

For healthcare facilities, the apparatus offers practical solutions for patient rooms or examination areas. The ability to control each light unit independently allows medical staff to adjust the lighting to suit specific needs, such as focused lighting for examinations or dimmer settings for patient comfort. The sleek and modern design of the apparatus also contributes to creating a calming and professional atmosphere.

Art galleries and museums can use the apparatus to create tailored lighting for exhibits. The connectors' rotation structure ensures that light can be directed precisely onto artwork or displays, minimizing glare and shadows. Additionally, the foldable segments enable curators to adjust the frame structure to fit various exhibit layouts, making the apparatus a versatile tool for showcasing art.

Finally, the lighting apparatus can play a significant role in sustainable and energy-efficient building designs. By incorporating light guide plates and reflective layers, the apparatus maximizes the use of light output while minimizing energy consumption. This makes it an excellent choice for green buildings, where reducing the carbon footprint is a priority. The modular and durable design ensures a long lifespan, aligning with the principles of sustainability and resource conservation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus comprising:

multiple light units, wherein each light unit comprises a bar housing, a light source, a light cover;

a first bar cover allocated for each light unit;

a second bar cover allocated for each light unit, wherein the first bar cover and the second bar cover are attached on two ends of the corresponding light unit to conceal the light source in the bar housing; and multiple connectors, wherein the multiple light units are joined by the connectors to form a frame light structure;

wherein the connector has a rotation structure for rotating a light output direction of the light source.

2. The lighting apparatus of claim 1, wherein each light unit has a conductive electrode for all the light units are electrically connected to an external wire to receive an external power.

3. The lighting apparatus of claim 1, wherein a frame layer is disposed being surrounded by the frame light structure.

4. The lighting apparatus of claim 3, wherein the frame layer is a light guide plate.

5. The lighting apparatus of claim 4, wherein a lateral side of the light guide plate faces to the light source of the light unit to receive an input light, wherein the input light escapes from the light guide plate from a front surface of the light guide plate.

6. The lighting apparatus of claim 5, wherein the light cover of the light unit has a lens for condensing the input light emitting to the light guide plate.

7. The lighting apparatus of claim 3, wherein the frame layer is a reflective layer.

8. The lighting apparatus of claim 7, wherein the frame layer is foldable.

9. The lighting apparatus of claim 1, wherein the connector has an electrical connector module for routing electricity among the light units.

10. The lighting apparatus of claim 1, wherein a control module is disposed on the connector for providing a control signal to the light source.

11. The lighting apparatus of claim 1, wherein each light unit has a controller for controlling a parameter of the light source separately.

12. The lighting apparatus of claim 11, wherein the controllers of the multiple light units communicate with each other to synchronize in a predetermined pattern.

13. The lighting apparatus of claim 12, wherein one controller of one light unit receives an external command and transmits the external command to the other controllers of other light units.

14. The lighting apparatus of claim 1, wherein the frame light structure is a rectangular shape.

15. The lighting apparatus of claim 14, wherein more than one light units are selectively disposed to the same edge of the rectangular shape.

16. The lighting apparatus of claim 14, wherein the light unit is coupled to the connector with a magnetic unit.

17. The lighting apparatus of claim 1, wherein the light unit has multiple segments and there are joined between two adjacent segments.

18. The lighting apparatus of claim 17, wherein the multiple segments are foldable.

19. The lighting apparatus of claim 1, wherein the light cover is detachable for a user to replace the light source.

* * * * *